(12) United States Patent
Tanguay et al.

(10) Patent No.: US 8,784,680 B2
(45) Date of Patent: Jul. 22, 2014

(54) BIORESIN COMPOSITION FOR USE IN FORMING A RIGID POLYURETHANE FOAM ARTICLE

(71) Applicant: BASF SE, Ludwigshafen (DE)

(72) Inventors: Christopher M. Tanguay, Trenton, MI (US); Patrick J. Watters, Allen Park, MI (US); John P. Erickson, Southgate, MI (US); Eric W. Banks, Houston, TX (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/899,202

(22) Filed: May 21, 2013

(65) Prior Publication Data

US 2013/0248759 A1  Sep. 26, 2013

Related U.S. Application Data

(62) Division of application No. 12/796,737, filed on Jun. 9, 2010, now Pat. No. 8,476,329.

(60) Provisional application No. 61/186,288, filed on Jun. 11, 2009.

(51) Int. Cl.
C08G 18/28 (2006.01)

(52) U.S. Cl.
USPC .................................. 252/182.24; 252/182.28

(58) Field of Classification Search
USPC ........................................ 252/182.24, 182.28
See application file for complete search history.

(56) References Cited

U.S. PATENT DOCUMENTS

| | | | |
|---|---|---|---|
| 2,909,537 A | 10/1959 | Chatfield | |
| 4,016,059 A | 4/1977 | Trecker et al. | |
| 5,266,714 A | 11/1993 | Stoll et al. | |
| 5,302,626 A | 4/1994 | Hoefer et al. | |
| 5,578,651 A | 11/1996 | Lamberts et al. | |
| 5,616,628 A | 4/1997 | von Bonin et al. | |
| 5,684,092 A | 11/1997 | Seifert et al. | |
| 5,710,190 A | 1/1998 | Jane et al. | |
| 6,001,890 A | 12/1999 | Hamilton | |
| 6,005,016 A | 12/1999 | Nodelman et al. | |
| 6,090,307 A * | 7/2000 | Forster et al. | 252/182.24 |
| 6,107,433 A | 8/2000 | Petrovic et al. | |
| 6,180,686 B1 | 1/2001 | Kurth | |
| 6,319,962 B1 | 11/2001 | Singh et al. | |
| 6,465,569 B1 | 10/2002 | Kurth | |
| 6,624,244 B2 | 9/2003 | Kurth | |
| 6,864,296 B2 | 3/2005 | Kurth | |
| 6,867,239 B2 | 3/2005 | Kurth | |
| 6,881,763 B2 | 4/2005 | Kurth | |
| 7,084,230 B2 | 8/2006 | Kurth et al. | |
| 7,893,287 B2 | 2/2011 | Casper et al. | |
| 2003/0105178 A1 | 6/2003 | Kurth | |
| 2005/0282921 A1 | 12/2005 | Flanigan et al. | |
| 2006/0041155 A1 | 2/2006 | Casper | |
| 2006/0041156 A1 | 2/2006 | Casper et al. | |
| 2006/0217451 A1 | 9/2006 | Bonapersona | |
| 2007/0129451 A1 | 6/2007 | Niemann | |
| 2008/0188582 A1 | 8/2008 | Lehmann et al. | |
| 2008/0234402 A1 | 9/2008 | Lehmann et al. | |
| 2010/0317760 A1 | 12/2010 | Tanguay et al. | |

FOREIGN PATENT DOCUMENTS

WO   WO 2006023798 A2   3/2006

* cited by examiner

*Primary Examiner* — John Cooney
(74) *Attorney, Agent, or Firm* — Howard & Howard Attorneys PLC

(57) ABSTRACT

A bioresin composition is used to form a rigid polyurethane article that includes a first and a second biopolyol and is substantially free of aprotic solvents that chemically decompose in the presence of water. The first biopolyol includes a natural oil component. The second biopolyol includes the reaction product of a natural carbohydrate and an alkylene oxide. The rigid polyurethane foam article includes the reaction product of the bioresin composition and an isocyanate which are reacted in the presence of a chemical blowing agent.

17 Claims, No Drawings

BIORESIN COMPOSITION FOR USE IN FORMING A RIGID POLYURETHANE FOAM ARTICLE

RELATED APPLICATIONS

This application is a divisional of and claims priority to and all advantages of U.S. Non-Provisional patent application Ser. No. 12/796,737, which was filed on Jun. 9, 2010, which claims priority to and all advantages of U.S. Provisional Patent Application No. 61/186,288, which was filed on Jun. 11, 2009.

FIELD OF THE INVENTION

The present invention generally relates to a rigid polyurethane foam article which is the reaction product of a bioresin composition and an isocyanate. More specifically, the bioresin composition includes first and second biopolyols and is substantially free of aprotic solvents that chemically decompose in the presence of water.

DESCRIPTION OF THE RELATED ART

Polyurethane foam articles are used extensively in a wide array of commercial and industrial applications. The popularity of polyurethane foam articles is due in part to the fact that the physical properties of a polyurethane foam article may be selectively altered based on a formulation of reactants which form the polyurethane foam article. The formulation may be developed to provide a polyurethane foam article that is soft, flexible and open-celled which, can be used in applications such as seat cushions. On the other hand, the formulation may be developed to provide a polyurethane foam article that is rigid, structural, thermally resistant and closed-celled which, can be used as a thermal insulation panel.

The most common method of forming polyurethane foam articles is the mixing and, subsequent reaction, of a polyol (e.g. a resin composition) with an isocyanate in the presence of a blowing agent. Generally, when the resin composition is mixed with the isocyanate to form a reaction mixture in the presence of the blowing agent, a urethane polymerization reaction occurs. As the urethane polymerization reaction occurs, the reaction mixture cross-links to form the polyurethane and gas is simultaneously formed and released. Through the process of nucleation, the gas foams the reaction mixture thereby forming voids or cells in the polyurethane foam article.

The resin composition typically comprises one or more polyols, a cell opening agent, a cross linking agent, a catalyst, an adhesion promoting agent and various additives. The blowing agent creates the cells in the polyurethane foam article as described above. The cell opening agent helps open the cells so that the cells form an interconnected network and improves the stability of the polyurethane foam article. The cross-linking agent promotes cross-linking of the reaction mixture which results in the polyurethane foam article. The catalyst controls reaction kinetics to improve the timing of the polymerization reaction by balancing a gel reaction and the blowing agent to create the polyurethane foam article, which is stable. The adhesion promoting agent (e.g. an aprotic solvent) facilitates wet out of the reaction mixture and promotes adhesion of the polyurethane foam article to substrates upon which the polyurethane foam article is disposed. For example, the substrate may be a thermoplastic shell or thermoplastic liner of a picnic cooler. The density and rigidity of the polyurethane foam article may be controlled by varying the chemistry of the isocyanate, the resin composition and/or the blowing agent, and amounts thereof.

A thermal insulating device such as the picnic cooler described above typically comprises a thermoplastic shell and a thermal core. Structural integrity and physical properties of a rigid polyurethane foam article make it an excellent thermal core for such a picnic cooler. When the rigid polyurethane foam article is used as the thermal core in this manner, the rigid polyurethane foam article not only provides thermal resistance, but the rigid polyurethane foam article also holds the picnic cooler together with cohesive and adhesive properties. The rigid polyurethane foam article typically fills the thermoplastic shell of the picnic cooler and wets out the inner surfaces of the thermoplastic shell uniformly, such that exterior surfaces of the picnic cooler are free of visual defects and the picnic cooler does not fall apart during use. When the resin composition is free of the aprotic solvent, the reaction mixture does not adequately wet out and sufficiently adhere to the thermoplastic shell and thermoplastic liner. Further, many aprotic solvents chemically decompose in the presence of water, generating carbon dioxide. Decomposition of the aprotic solvent in the resin composition and concurrent release of carbon dioxide typically pressurizes resin storage containers, and in extreme cases causes the resin storage container to fail.

Furthermore, conventional polyurethane foam articles are made from petroleum based polyols. As a non-renewable feedstock, petroleum has both environmental and financial drawbacks. Accordingly, there are environmental, economic, and commercial advantages associated with the use of polyols based on renewable feedstock to make bio-based polyurethane foam articles. Biopolyols are considered a good alternative to petroleum-based polyols for the production of bio-based polyurethane foam articles. Typically, biopolyols include one or more modified natural oils, natural carbohydrates or other renewable feedstocks.

In view the foregoing, it would be advantageous to develop an improved rigid polyurethane foam article, the rigid polyurethane foam article formed from a bioresin composition. The rigid polyurethane foam article having exception cell structure and rigidity, robust adhesion to thermoplastic substrates and excellent thermal resistance.

SUMMARY OF THE INVENTION AND ADVANTAGES

The instant invention provides a bioresin composition. The bioresin composition is substantially free of aprotic solvents that chemically decompose in the presence of water. The bioresin composition includes (i) a first biopolyol comprising a natural oil component. The bioresin composition further includes (ii) a second biopolyol comprising the reaction product of a natural carbohydrate and an alkylene oxide. The second biopolyol is present in excess relative to the first biopolyol in a weight ratio of from greater than 1:1 to about 3:1. The bioresin composition also includes an aprotic solvent that does not chemically decompose in the presence of water. The bioresin composition is reacted with an isocyanate in the presence of a chemical blowing agent to form a rigid polyurethane foam article.

The bioresin composition is particularly useful for the formation of the rigid polyurethane foam article. The rigid polyurethane foam article is an excellent thermal core for a thermal insulating device. The rigid polyurethane foam article has physical properties that are attributable, at least in part, to the bioresin composition and selection of the first biopolyol and the second biopolyol, as well as the ratio therebetween. In addition, use of the aprotic solvent that does not decompose in the presence of water reduces a chance of the bioresin composition generating gas (e.g. carbon dioxide) and pressurizing resin containers used to store and transport the bioresin composition. The bioresin composition of the present invention reduces a chance that the resin containers will become pressurized and fail from the gas forming chemical reaction of an aprotic solvent and water. The bioresin composition also reduces a need to use specially vented and/or explosion proof resin containers.

DETAILED DESCRIPTION OF THE INVENTION

The present invention provides a rigid polyurethane foam article that is herein after referred to as an "article". The article may be formed within a cavity or between two substrates, molded, formed into boards, or foamed-in-place to form an article that molds and adheres to contacting surfaces. In one embodiment, the article is further defined as a thermal core disposed between an outer and an inner wall of a thermal insulating device such as a picnic cooler. In other embodiments, the article is used in a variety of applications such as in refrigeration appliances or building and construction products. Of course, the article of the present invention is not limited to these embodiments.

The article adheres to various substrates, while exhibiting excellent thermal transmission properties. As is well know in the art, thermal transmission properties include thermal resistance and thermal conductivity. Thermal resistance is related to a K-factor; the greater the thermal resistance the lower the K-factor. Typically, the K-factor is measured in accordance to ASTM C 518.

The article includes a reaction product of a bioresin composition and an isocyanate which react in the presence of a blowing agent. The isocyanate and the blowing agent are described in greater detail below. The bioresin composition, herein after referred to as a "composition", includes a first and a second biopolyol and is substantially free of aprotic solvents that chemically decompose in the presence of water. The physical properties of the article may be controlled by varying the composition of the bioresin composition.

The terminology "substantially free", as used herein in reference to the aprotic solvent that chemically decomposes in the presence of water, refers to a sufficiently low amount of the aprotic solvent, such that generation of $CO_2$ gas is minimized. Typically, the amount of the aprotic solvent that chemically decomposes in the presence of water that is present in the composition is less than 5, more typically less than 0.5, still more typically less than 0.1, and most typically zero, percent by weight based on the total weight of the composition.

As first described above, the composition includes the first biopolyol. The first biopolyol typically has a nominal functionality of greater than 1.5 and more typically of greater than 2.5. The first biopolyol also typically has a hydroxyl number of from about 200 to about 550, more typically of from about 400 to about 550, and most typically of from about 425 to about 525, mg KOH/g as calculated using ASTM D4274. The first biopolyol also typically has a viscosity of from about 500 to about 1500 and most typically of from about 750 to about 1250, cps at 77° F., when tested with a Brookfield viscometer using a No. 21 spindle and at various speeds depending on the polyol. The speed of the spindle is determined by the percent torque specific to the polyol and is set when the measurement is in the center of the scale or higher.

The first biopolyol includes a natural oil component. The natural oil component includes at least one natural oil, the reaction product of at least one natural oils and a compound reactive therewith, and combinations thereof. A natural oil may be further defined as a triglyceride. Alternatively, natural oils may include a mixture of differing triglycerides. One particularly suitable natural oil is castor oil. As is well known in the art, castor oil is produced directly from a plant source and includes hydroxyl groups. Other natural oils, which do not have hydroxyl groups, and which have carbon-carbon double bonds, typically require oxidation of the carbon-carbon double bonds to form hydroxyl groups. Some suitable natural oils include but are not limited to canola oil, castor oil, peanut oil, soy bean oil and combinations thereof.

A particularly suitable first biopolyol is PEL-SOY™ 744 sold under the trademark PEL-SOY™ and commercially available from Pelron Corporation. PEL-SOY™ 744 is a soy bean oil based biopolyol having a nominal functionality of 2.5, a hydroxyl number of 474 mg KOH/g, and a viscosity of 1031 cps at 77° F. Specific examples of other first biopolyols that are suitable for the purposes of the present invention include, but are not limited to: SOYOL™ R22-052-G and SOYOL™ R3-170-G, both sold under the trademark SOYOL™ and commercially available from Urethane Soy Systems Company; POYLCIN® GR-35, POYLCIN® GR-340, POYLCIN® D-265, and POYLCIN® T-400, all sold under the trademark POYLCIN® and commercially available from Vertellus; VIKOL™ 1 sold under the trademark VIKOL™ and commercially available from Arkema Corporation; biopolyols sold under the trademark RENUVA™ and commercially available from Dow Chemical Corporation; biopolyols sold under the trademark BiOH™ and commercially available from Cargill Corporation; and AGROL® 2.0, AGROL® 3.0, AGROL® 4.0, AGROL® 5.0, AGROL® 6.0, and AGROL® 7.0, all sold under the trademark AGROL® and commercially available from BioBased Technologies. Of course, the first biopolyol may include any combination of two or more of the aforementioned first biopolyols. The first biopolyol is typically present in the composition in an amount of from about 10 to about 100, more typically of from about 15 to about 70, and most typically of from about 20 to about 70, parts by weight based on 100 parts by weight of the composition.

In addition to the first biopolyol, the composition also includes the second biopolyol which is different from the first biopolyol. The second biopolyol typically has a nominal functionality of greater than 2.0, and more typically of greater than 4.0. The second biopolyol also typically has a hydroxyl number of from about 250 to about 550, more typically of from about 300 to about 450, and most typically of from about 360 to about 375, mg KOH/g as calculated by ASTM D4274. The second biopolyol typically has a viscosity of from about 2000 to about 5000, most typically of from about 3000 to from about 4000 and most typically of from about 3250 to about 3750, cps at 77° F., when tested with a Brookfield viscometer using a No. 21 spindle and at various speeds depending on the polyol. The speed of the spindle is determined by the percent torque specific to the polyol and is set when the measurement is in the center of the scale or higher.

The second biopolyol includes the reaction product of a natural carbohydrate and an alkylene oxide. Natural carbohydrates include sugars such as monosaccharides or disaccharides, and sugar alcohols. As is well know in the art, sugar alcohols are hydrogenated sugars whose carbonyl group has been reduced to a primary or secondary hydroxyl group. One example of a natural carbohydrate is sacharose from sugar beets. Other suitable examples include, but are not limited to fructose, galactose, glucose, lactose, maltose, trehalose, and cellobiose. Preferably, the alkylene oxide that reacts with the natural carbohydrate to form the polyol is selected from the group of ethylene oxide, propylene oxide, butylene oxide, amylene oxide, tetrahydrofuran, alkylene oxide-tetrahydrofuran mixtures, epihalohydrins, aralkylene oxides, and combinations thereof. More preferably, the alkylene oxide is selected from the group of ethylene oxide, propylene oxide, and combinations thereof. However, it is also contemplated that any suitable alkylene oxide that is known in the art may be used in the present invention.

A particularly suitable second biopolyol is PLURACOL® SG-360 sold under the trademark PLURACOL® and commercially available from BASF Corporation. PLURACOL® SG-360 is a sacharose based biopolyol having, a nominal functionality of 4.0, a hydroxyl number of 368 mg KOH/g, and a viscosity of 3500 cps at 77° F. Other sucrose based second biopolyols with functionalities similar to this one are particularly suitable as well. Of course, the second biopolyol may include any combination of two or more second biopolyols.

The second biopolyol is typically present in the composition in an amount of from about 10 to from about 100, more typically in an amount of from about 15 to from about 70, and most typically in an amount of from about 40 to from about 60, parts by weight based on 100 parts by weight of the composition. Accordingly, the second biopolyol is typically present in the composition in weight excess relative to the first biopolyol. A weight ratio of the first biopolyol to the second biopolyol in the composition is typically of from about 2.0:1.0 to about 1.0:4.0, more typically of from about 1.0:1.0 to about 1.0:3.0, and most typically of from about 1.0:1.0 to about 1.0:2.5. The selection and the ratio of the first and second biopolyol are important to the formation of the article. When forming the article, this ratio contributes to optimal processing conditions, such as viscosity and reaction speed. Furthermore, the ratio contributes a crosslink density needed to form a suitable article, i.e., a rigid polyurethane foam article having excellent cell strength and foam structure.

In addition to the first and second biopolyols, the composition may also include a supplemental polyol that is different than the first and second biopolyols. The supplemental polyol typically includes the reaction product of toluenediamine and the alkylene oxide, as described above. The supplemental polyol typically has a nominal functionality of greater than 2.0, and more typically of greater than 4.0. The supplemental polyol also typically has a hydroxyl number of from about 200 to about 700, more typically of from about 300 to about 450, and most typically of from about 438 to about 465, mg KOH/g as calculated by ASTM D4274. The supplemental polyol also typically has a viscosity of from about 3000 to about 800, most typically of from about 4000 to from about 7000 and most typically of from about 5000 to about 6000, cps at 77° F., when tested with a Brookfield viscometer using a No. 21 spindle and at various speeds depending on the polyol. The speed of the spindle is determined by the percent torque specific to the polyol and is set when the measurement is in the center of the scale or higher.

A particularly suitable supplemental polyol is PLURACOL® P-735 sold under the trademark PLURACOL® and commercially available from BASF Corporation. PLURACOL® P-735 has a nominal functionality of at least 4, a hydroxyl number of from about 438 to about 465 mg KOH/g, and a viscosity of 5,500 cps at 77° F. Additional non-limiting examples of supplemental polyols that are suitable for use in the present invention include PLURACOL® P-1158 and PLURACOL® P-2097 both also sold under the trademark PLURACOL® and commercially available from BASF Corporation. It is to be appreciated that the supplemental polyol may include any combination of two or more of the aforementioned supplemental polyols. The supplemental polyol is typically present in the composition in an amount less than or equal to about 50, more typically in an amount less than or equal to about 35, and most typically in an amount less than or equal to about 15, parts by weight based on 100 parts by weight of the composition.

The composition also includes an aprotic solvent that does not chemically decompose in the presence of water. The aprotic solvent is stable in the presence of water and will not typically decompose into one or more chemical compounds (e.g. gasses) in the presence of water. The aprotic solvent that does not chemically decompose in the presence of water typically functions as an adhesion promoter in the composition. This aprotic solvent of the present invention provides ionic properties, without donating an acidic hydrogen molecule, to a reaction mixture comprising the composition and the isocyanate. The ionic properties of the aprotic solvent promotes uniform wetting out of surfaces, thus allowing for improved adhesion of the article to the surfaces.

Suitable examples of aprotic solvents that do not decompose in the presence of water include but are not limited to diethyl carbonate, chloroform, N,N-dimethylacetamide, dimethyl sulfoxide, N,N-dimethylformamide, dimethylpropylene urea, dimethyl carbonate, dioxane, ethyl methyl carbonate, hexamethylphosphorotriamide, N-methylpyrrolidinone, tetrahydrofuran, and triethyl phosphate. It is to be appreciated that the aprotic solvent that does not chemically decompose in the presence of water may include any combination of two or more of the aforementioned aprotic solvents that do not chemically decompose in the presence of water. A particularly suitable aprotic solvent that does not chemically decompose in the presence of water is triethyl phosphate commercially available from Eastman Corporation. Generally, triethyl phosphate is readily available and is advantageous from a health and safety standpoint. The aprotic is typically present in the composition in an amount of from about greater than 0 to about 15, more typically of from greater than 0 to about 10, and most typically of from about 3 to from about 7.5, parts by weight based on 100 parts by weight of the composition.

The composition of the present invention also typically includes a fatty acid as a cell opening agent. The cell opening agent helps open the cells of the article so that the cells form an interconnected network within the article and to improve foam stability. In one embodiment, wherein the article is molded to fill the core of the thermal insulating device, open celled content is desired.

The fatty acid of this invention is typically an organic carboxylic acid (mono and/or dibasic) having from 7 to 100 carbon atoms, more typically from 10 to 25 carbon atoms, and most typically from 12 to 18, carbon atoms. The fatty acid can be saturated or unsaturated, aliphatic or cycloaliphatic, unsubstituted or substituted with other functional groups such as hydroxyl groups. Suitable fatty acids include, but are not limited to, lauric acid, myristoleic acid, palmotoeic acid, palmitic acid, linoleic acid, oleic acid, acetyl acid, and stearic acid. Mixtures of two or more of the above described cell fatty acids can be used. A particularly suitable fatty acid is oleic acid. The fatty acid is typically present in the composition in an amount of from 0.1 to from about 20.0 parts by weight, typically between 0.5 and 5.0 by weight and most typically between 0.5 and 2.0 parts based on 100 parts by weight of the composition.

Moreover, the composition may also include a surfactant or more than one surfactant. Suitable surfactants include conventional surfactants known in the art, such as anionic, cationic, non-ionic surfactants, and mixtures thereof. Suitable nonionic surfactants typically include those prepared by sequential addition of propylene oxide and then ethylene oxide to propylene glycol, solid or liquid organosilicones, polyethylene glycol ethers of long chain alcohols, tertiary amines or alkylolamine salts of long chain alkyl acid sulfate esters, alkyl sulfonic ester and alkyl arylsulfonic acids. Liquid organosilicones, specifically those that are not hydrolyzable, are also useful. A specific, non-limiting example of a suitable surfactant is DABCO® DC 5604, a silicone surfactant, sold under the trademark DABCO® and commercially available from Air Products and Chemicals, Inc. Another specific, non-limiting example of the suitable surfactant is TEGOSTAB® B 8433, a silicone surfactant sold under the trademark TEGOSTAB® and commercially available from Evonik. It is to be appreciated that the surfactant may include any combination of two or more of the aforementioned surfactants. The surfactant may be included in the composition in various amounts. In certain embodiments, the surfactant is present in an amount of from about 0.5 to about 10, more typically from about 0.5 to about 5, and most typically from about 0.5 to about 3, parts by weight based on 100 parts by weight of the composition.

The composition may also include a catalyst which catalyzes the reaction of the composition and the isocyanate in the reaction mixture, first described above. The catalyst promotes cross-linking of the reaction mixture to form article. The catalyst is thought to influence reaction kinetics to help tailor the physical properties of the article. In one embodiment, the catalyst includes at least one tertiary amine catalyst. Examples of tertiary amine catalysts that are particularly useful for purposes of the present invention include, but are not limited to dimethylaminoethanol, dimethylaminoethoxyethanol, triethylamine, N,N,N',N'-tetramethylethylenediamine, N,N-dimethylaminopropylamine, N,N,N',N',N"-pentamethyldipropylenetriamine, tris(dimethylaminopropyl) amine, N,N-dimethylpiperazine, tetramethylimino-bis (propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N"-pentamethyldiethylenetriamine, 1,2-dimethylimidazole, 3-(dimethylamino) propylimidazole, and combinations thereof. Specific, non-limiting examples of suitable tertiary amine catalysts are DABCO® DMCHA, DABCO® 33LV, DABCO® BL-17, and DABCO® BL-19 all sold under the trademark DABCO® and commercially available from Air Products and Chemicals, Inc. Another specific, non-limiting example of the suitable tertiary amine catalyst is POLYCAT® 12 sold under the trademark POLYCAT® also commercially available from Air Products and Chemicals, Inc. The catalyst is typically present in an amount of from about 0.01 to about 3.5, more typically from about 0.05 to about 2.5, and most typically from about 0.05 to about 1.5, parts by weight, based on 100 parts by weight of the composition. It is to be appreciated that the catalyst may include any combination of two or more of the aforementioned catalysts.

Still further, the composition may include one or more additives. The one or more additives may include, but are not limited to, additional catalysts used to enhance the formation of the article, such as tin catalysts (e.g. tin octoate and dibutyltindilaurate), imidazoles (e.g. dimethylimidazole), maleate esters, acetate esters, fire retardants, smoke suppressants, UV-stabilizers, colorants, microbial inhibitors and fillers and any combination thereof.

As described above, the composition is reactive with the isocyanate in the presence of the blowing agent. The isocyanate is typically an organic polyisocyanate having two or more functional groups, e.g. two or more NCO functional groups. Suitable organic polyisocyanates, for purposes of the present invention include, but are not limited to, conventional aliphatic, cycloaliphatic, araliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

In another embodiment, the isocyanate is further defined as an isocyanate-terminated prepolymer. The isocyanate-terminated prepolymer is typically a reaction product of an isocyanate and a polyol and/or a polyamine. The isocyanate may be any type of isocyanate known to those skilled in the polyurethane art, such as one of the organic polyisocyanates described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, such as soybean oil, castor-oil, soy-protein, rapeseed oil, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific examples of suitable isocyanates include LUPRANATE® M, LUPRANATE® ME, LUPRANATE® MI, and LUPRANATE® M20S, all sold under the trademark LUPRANATE® and commercially available from BASF Corporation. Typically, the isocyanate is present in an amount of from about 25 to about 60, more typically from about 30 to about 50, and most typically from about 35 to about 45, parts by weight, based on 100 parts by weight of the article. It is to be appreciated that the isocyanate may include any combination or two of more of the aforementioned isocyanates and isocyanate-terminated prepolymers.

Also described above, the bioresin composition is reacted with the isocyanate in the presence of the blowing agent to form the article. The reaction of the blowing agent and the isocyanate typically forms urea linkages and carbon dioxide to crosslink and foam the article. The gas may also be generated if the blowing agent boils. Through the process of nucleation, the gas foams the reaction mixture thereby forming voids or cells in the polyurethane foam article; the article of the present invention having about 50% open cells and 50% closed cells. A particularly suitable blowing agent is water. Alternatively, chemical blowing agents may be used with a physical blowing agents such as hydrocarbons, CFC's and HCFC's, $N_2$ and $CO_2$ and combinations thereof. The amount of the blowing agent used typically depends on a desired density of the article. Typically, the amount of the blowing agent used is of from about 0.8 to about 10 parts by weight based on 100 parts by weight the composition.

EXAMPLES

Examples 1-4 and Comparative Example 1 are described herein. A series of examples of rigid polyurethane foam articles (Examples 1-4) are formed using resin compositions described below in Table 1. The chemical and physical performance properties of Examples 1-4 and Comparative Example 1, such as overall foam structure and adhesion to thermoplastic substrates, are able to be tested.

The amounts in Table 1 are in parts by weight based on 100 parts by weight of the compositions. The compositions set forth in Table 1 are reacted at an isocyanate index of 110 to form the rigid polyurethane foam articles. As well known in the art, isocyanate index is a measure of an actual molar amount of isocyanate reacted with the composition relative to a theoretical molar amount of isocyanate needed to react with an equivalent molar amount of the composition and isocyanate index is calculated using the following formula:

$$\text{Isocyanate Index} = \frac{\text{Actual amount of isocyanate used}}{\text{Theoretical amount of isocyanate required}} \times 100$$

TABLE 1

| Resin Composition | Example 1 | Example 2 | Example 3 | Example 4 | Comparative Example 1 |
|---|---|---|---|---|---|
| Polyol A | 29.20 | 29.90 | 29.20 | 25.80 | — |
| Polyol B | 45.00 | 46.30 | 45.00 | 50.67 | 45.00 |
| Polyol C | 10.00 | 10.30 | 10.00 | — | — |
| Polyol D | — | — | — | 10.14 | — |
| Polyol E | — | — | — | — | 29.20 |
| Polyol F | — | — | — | — | 10.00 |
| Blowing Agent | 6.50 | 6.70 | 6.50 | 5.53 | 6.50 |
| Aprotic Solvent A | 5.00 | 2.50 | 5.00 | 4.61 | — |
| Aprotic Solvent B | — | — | — | — | 5.00 |
| Surfactant A | 1.50 | — | — | — | — |
| Cell Opening Agent A | 1.00 | — | — | — | — |
| Surfactant B | — | 1.50 | 1.50 | 1.38 | 1.50 |
| Cell Opening Agent B | — | 1.00 | 1.00 | 1.01 | 1.00 |
| Catalyst A | 1.00 | 1.00 | 1.00 | — | 1.00 |
| Catalyst B | 0.50 | 0.50 | 0.50 | — | 0.50 |
| Catalyst C | 0.30 | 0.30 | 0.30 | 0.40 | 0.30 |
| Catalyst D | — | — | — | 0.46 | — |
| Total Resin Composition | 100.00 | 100.00 | 100.00 | 100.00 | 100.00 |
| Isocyanate Index | 110 | 110 | 110 | 110 | 110 |

Polyol A is PEL-SOY™ 744, a biopolyol formed from soy oil and sold under the trademark PEL-SOY™ 744.
Polyol B is PLURACOL® SG-360, a biopolyol formed from sacharose and sold under the trademark PLURACOL®.
Polyol C is PLURACOL® P-735, a supplemental polyol that is formed from trimethylolpropane and sold under the trademark PLURACOL®.
Polyol D is PLURACOL® P-2097, a supplemental polyol sold under the trademark PLURACOL®.
Polyol E is PLURACOL® GP-730, a supplemental polyol that is formed from glycerin and sold under the trademark PLURACOL®.
Polyol F is PLURACOL® P-1158, a supplemental polyol formed from trimethylolpropane and sold under the trademark PLURACOL®.
The Blowing Agent is water.
Aprotic Solvent A is triethyl phosphate.
Aprotic Solvent B is propylene carbonate.
Cell Opening Agent A is oleic acid.
Cell Opening Agent B is ORTEGOL™ 501, a cell opening agent sold under the trademark ORTEGOL™.
Surfactant A is DABCO® DC 5604, a surfactant formed from silicone and sold under the trademark DABCO®.
Surfactant B is TEGOSTAB™ B 8433, a surfactant formed from silicone and sold under the trademark TEGOSTAB™.
Catalyst A is DABCO® DMCHA, an amine catalyst sold under the trademark DABCO®.
Catalyst B is DABCO® 33LV, an amine catalyst sold under the trademark DABCO®.
Catalyst C is DABCO® BL17, an amine catalyst sold under the trademark DABCO®.
Catalyst D is POLYCAT® 12, a bis(dimethylaminoethyl)ether catalyst sold under the trademark POLYCAT®.
Isocyanate is LUPRANATE® M20S, an isocyanate sold under the tradename LUPRANATE®.

The rigid polyurethane foam articles of Examples 1-4 and Comparative Example 1 are prepared and mixed with a stoichiometric excess of the isocyanate at room temperature to form reaction mixtures. The reaction mixtures are processed with a Linden machine having an impingement mix head. More specifically, the reaction mixtures are processed at 1720 RPM for 5 seconds with an injection pressure of 2000 PSI. Once processed, 250 grams of a reaction mixture is injected into a mold and thereafter expands to fill the mold and form the rigid polyurethane foam article. After formation, the rigid polyurethane foam article is evaluated to determine adhesive strength, cell strength, flow, porosity and shrinkage.

Adhesive strength is measured according to ASTM D413. Adhesive strength is a measure of a force required to remove a thermoplastic coupon from an exterior of a rigid polyurethane foam plaque (herein referred to as a foam plaque). The foam plaque is 12×12×2 inches in dimension, has a target density of 1.86 Lb/ft$^3$, and has thermoplastic coupons secured to the exterior surface thereof. Thermoplastic coupons are cut from polypropylene and other substrates of commercial importance to dimensions specified in ASTM D413. Prior to forming and molding, flame treated thermoplastic coupons are secured to the sidewalls of a 12×12×2 inch mold. Next, 141 grams of each of the reaction mixtures described above, at ambient temperature, are sequentially injected into molds having temperatures of 115-120° F. to form the foam plaques. After forming, the foam plaques are removed from the mold and have the thermoplastic coupons secured to the exterior surfaces thereof. An Instron is used to measure the force required to separate the thermoplastic coupons from the foam plaques at 0.05 inches per minute. Generally, maximized adhesive strength values (PSI) are desired. The adhesive strength of Example 2 is greater than the adhesive strength of Example 3, i.e., the adhesive strength improves as the amount of Aprotic Solvent A in the resin composition is increased. In addition, the adhesive strength of Example 3 is greater than the adhesive strength of Comparative Example 1, which is formed from a resin composition without Aprotic Solvent A.

Cell strength is an observation of the puncture resistance of the rigid polyurethane foam article. The test entails the forceful application of a probe on the rigid polyurethane foam article by one skilled in the art.

Back pressure is evaluated by pouring 250 grams of each of the reaction mixtures into cups and allowing the rigid polyurethane foam articles to form in the cups. When the rigid polyurethane foam articles form in the cups, voids are typically formed at the bottoms of the cups and subjectively examined to determine whether there is adequate back pressure based on the characteristics of the molded sample. Generally, if the cup fills up completely, flow is adequate.

Porosity is measured according to ASTM D6226. Porosity is a numerical determination of an amount of open cells in the rigid polyurethane foam article, i.e., an accessible cellular volume of the rigid polyurethane foam article as a percentage. Generally, lower porosity values contribute to improved performance properties and allow for more efficient processing of the rigid polyurethane foam article.

Shrinkage is determined by a visual observation of the molding process as well as an objective observation as to changes in dimension of the rigid polyurethane foam article over time. Dimensional stability of the rigid polyurethane foam article is desired.

Example 1 exhibits excellent adhesive strength, cell strength, flow, and shrinkage. These properties result, at least in part, from the selection of polyols A and B, i.e., the polyols of this invention. Still further, the excellent adhesion strength results, in part, from Aprotic Solvent A. The adhesive strength of Example 3 demonstrates an impact of Aprotic Solvent A. Still further, the excellent porosity results, in part, from Cell Opening Agent A. Together, a relationship is demonstrated between performance properties, such as adhesive strength, cell strength, and porosity, and changes to the resin composition of the subject invention.

Comparative Example 1 is conventional rigid polyurethane foam article. Comparative Example 1 exhibits adequate adhesion to thermoplastic substrates, cell strength, flow, porosity and shrinkage. However, Comparative Example 1 does not have the significant levels of biobased chemicals and the chemical stability of the subject invention.

Accordingly, the examples demonstrate the use of the resin composition that is (a) chemically stable in the presence of water and (b) includes biopolyols and other environmentally friendly components to form a rigid polyurethane foam article having excellent adhesion to thermoplastic substrates, cell strength, flow, porosity, shrinkage and overall foam structure.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

What is claimed is:

1. A bioresin composition substantially free of aprotic solvents that chemically decompose in the presence of water, said bioresin composition comprising:
    (A) a first biopolyol comprising a natural oil component, said first biopolyol having:
        (a) a nominal functionality of at least 2.5,
        (b) a hydroxyl number of from about 375 to about 575 mg KOH/g, and
        (c) a viscosity of from about 500 cps to about 1500 cps at 77° F.,
    (B) a second biopolyol comprising the reaction product of a natural carbohydrate and an alkylene oxide,
    wherein said second biopolyol and said first biopolyol are present in a weight ratio of greater than 1:1 to about 3:1, and
    (C) an aprotic solvent that does not chemically decompose in the presence of water.

2. A bioresin composition as set forth in claim 1 wherein said second biopolyol and said first biopolyol are present in a weight ratio of greater than 1:1 to about 2.5:1.

3. A bioresin composition as set forth in claim 1 wherein said natural oil component comprises one or more natural oils comprising triglycerides, the reaction product of one or more natural oils comprising triglycerides and a compound reactive with said natural oil, and combinations thereof.

4. A bioresin composition as set forth in claim 3 wherein said natural oil is selected from the group of canola oil, castor oil, peanut oil, corn oil, soy oil, other vegetable oils, and combinations thereof.

5. A bioresin composition as set forth in claim 3 wherein said natural oil is soy oil.

6. A bioresin composition as set forth in claim 1 wherein said natural carbohydrate is selected from the group of a sacharose, sugar alcohol and combinations thereof.

7. A bioresin composition as set forth in claim 6 wherein said sugar comprises a disaccharide and said sugar alcohol comprises a triglyceride.

8. A bioresin composition as set forth in claim 7 wherein said disaccharide is sacharose.

9. A bioresin composition as set forth in claim 7 wherein said triglyceride is glycerin.

10. A bioresin composition as set forth in claim 8 wherein said second biopolyol has a nominal functionality of at least 4, a hydroxyl number of from about 360 to about 375 mg KOH/g, and a viscosity of from about 3000 cps to about 4000 cps at 77° F.

11. A bioresin composition as set forth in claim 1 further comprising a supplemental polyol that is different than said first and second biopolyols and is not a biopolyol.

12. A bioresin composition as set forth in claim 11 wherein said supplemental polyol is present in an amount no greater than about 20 parts by weight based on 100 parts by weight of said bioresin composition.

13. A bioresin composition as set forth in claim 1 wherein said aprotic solvent that does not chemically decompose in the presence of water is selected from the group of dimethyl sulfoxide, dimethylformamide, dioxane, hexamethylphosphorotriamide, tetrahydrofuran, triethyl phosphate, and combinations thereof.

14. A bioresin composition as set forth in claim 1 wherein said aprotic solvent that does not chemically decompose in the presence of water is triethyl phosphate.

15. A bioresin composition as set forth in claim 1 further comprising a fatty acid as a cell opening agent.

16. A bioresin composition as set forth in claim 15 wherein said fatty acid is oleic acid.

17. A bioresin composition as set forth in claim 15 wherein said cell opening agent is present in an amount of from about 0.1 to about 11 parts by weight based on 100 parts by weight of said bioresin composition.

* * * * *